United States Patent [19]

Mehta

[11] Patent Number: 4,582,432

[45] Date of Patent: Apr. 15, 1986

[54] ROTARY PROCESSORS AND METHODS FOR MIXING LOW VISCOSITY LIQUIDS WITH VISCOUS MATERIALS

[75] Inventor: Pradip S. Mehta, Corpus Christi, Tex.

[73] Assignee: USM Corporation, Flemington, N.J.

[21] Appl. No.: 685,055

[22] Filed: Dec. 20, 1984

[51] Int. Cl.[4] .................... B01F 7/10; B29B 1/06

[52] U.S. Cl. .................... 366/75; 366/76; 366/99; 366/171; 366/172; 366/307; 366/315

[58] Field of Search .................... 366/52, 168, 69, 171, 366/96-99, 136, 172, 293, 262-265, 315, 302-307, 336-340, 102-104; 425/224, 374, 466, 86, 207, 376

[56] References Cited

U.S. PATENT DOCUMENTS

| | | | |
|---|---|---|---|
| 3,082,816 | 3/1963 | Skidmore . | |
| 3,267,075 | 8/1966 | Schnell et al. . | |
| 3,799,234 | 3/1974 | Skidmore . | |
| 3,963,558 | 6/1976 | Skidmore . | |
| 4,142,805 | 3/1979 | Tadmor | 366/97 |
| 4,194,841 | 3/1980 | Tadmor | 366/75 |
| 4,207,004 | 6/1980 | Hold et al. | 366/97 |
| 4,213,709 | 7/1980 | Valsamis | 366/76 |
| 4,227,816 | 10/1980 | Hold et al. | 366/99 |
| 4,255,059 | 3/1981 | Hold et al. | 366/97 |
| 4,289,319 | 9/1981 | Hold et al. | 366/97 X |
| 4,300,842 | 11/1981 | Hold et al. | 366/99 |
| 4,329,065 | 5/1982 | Hold et al. | 366/97 |
| 4,389,119 | 6/1983 | Valsamis et al. | 366/99 |
| 4,402,616 | 9/1983 | Valsamis et al. | 366/99 |
| 4,411,532 | 10/1983 | Valsamis et al. | 366/99 |
| 4,413,913 | 11/1983 | Hold et al. | 366/75 |
| 4,421,412 | 12/1983 | Hold et al. | 366/76 |
| 4,480,923 | 11/1984 | Mehta | 366/99 |
| 4,486,099 | 5/1984 | Tadmor . | |

*Primary Examiner*—Timothy F. Simone
*Attorney, Agent, or Firm*—Thomas S. Szatkowski

[57] ABSTRACT

Rotary processors and methods for mixing a low viscosity liquid with a viscous material while controlling plugging of the means for introducing low viscosity liquid to the processor. Viscous material is introduced to a mixing rotary processor comprising at least one annular channel carried by a rotor and enclosed by a housing to form a mixing passage. The material is dragged forward by the rotating channel walls from the passage inlet past a spreader as films on the channel walls, forming a void downstream of the spreader between the films. Low viscosity liquid is sprayed from a point within the void to be deposited on and carried downstream with the films of material and to be mixed with material collected at a passage end wall.

In one embodiment, pressure sealing means permits spraying into a saturated vapor zone in the void so that liquid vaporizes and is condensed onto the films as well distributed fine droplets. An especially preferred embodiment provides devolatilizing apparatus in which a low viscosity, low boiling devolatilizing aid is deposited onto and mixed with a viscous material to aid in the removal of one or more difficultly devolatilizable impurities.

22 Claims, 4 Drawing Figures

ROTARY PROCESSORS AND METHODS FOR MIXING LOW VISCOSITY LIQUIDS WITH VISCOUS MATERIALS

THE FIELD OF THE INVENTION

This invention relates to novel methods and apparatus for processing viscous materials and particularly to rotary processors and methods for mixing low viscosity liquids with viscous materials.

DESCRIPTION OF THE PRIOR ART

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065; 4,389,119, 4,402,616; 4,411,532; 4,413,913; 4,421,412 and in commonly assigned, copending U.S. Pat. Applications Ser. Nos. 532,156; 532,157; 532,162, issued as U.S. Pat. No. 4,486,099, 532,165 issued as U.S. Pat. No. 4,480,923 and 532,166, all filed Sept. 14, 1983.

Essential elements of the basic individual processing passage of rotary processors disclosed in the above Patents and Applications comprise a rotatable element carrying at least one processing channel and a stationary element providing a coaxial closure surface forming with the channel an enclosed processing passage. The stationary element provides a feed inlet and a discharge outlet for the passage. A stationary blocking member near the outlet provides an end wall surface to block movement of material fed to the passage and to coact with the moving channel walls to establish relative movement between the blocked material and the moving channel walls. This coaction permits material in contact with the moving walls to be dragged forward to the end wall surface for collection and/or controlled processing, and discharging. As disclosed in the above Patents and Applications, the processing passages present a highly versatile processing capability. U.S. Pat. No. 4,421,412 discloses apparatus for melting particulate materials, and includes means for improving mixing of melted and unmelted material to increase the melting efficiency of the processor. U.S. Pat. No. 4,142,805 and No. 4,194,841 disclose in one embodiment apparatus and methods providing a mixing dam extending part way into the channel between the inlet and the outlet to improve mixing by increasing the shearing action on the material in the passage. A port may be provided through the housing downstream of the dam to remove material from or add material to a void created downstream of the dam. However, none of these patents discloses or claims apparatus or methods for introducing a low-viscosity material to a a mixing passage for improved mixing with a viscous material.

U.S. Pat. Nos. 4,255,059; 4,329,065 and 4,413,913 relate to apparatus and method for devolatilizing viscous materials by spreading the material as thin films on the sides of the rotating channel walls so that volatile materials can be withdrawn from the surfaces of the thin films. Applications Ser. Nos. 532,162 and 532,166 disclose apparatus and methods for foam devolatilizing of viscous materials involving feeding the material to the processing passage, inducing foaming by formation of bubbles of volatiles and non-pressurizing shearing to release the volatiles for removal from the the passage. Application No. 532,156 discloses a vacuum system for use with either film or foam devolatilizers. Applications Nos. 532,157 and 532,165 disclose sealing means to control leakage of pressure (e.g. while operating under high vacuum) and material between processing passages at different pressure levels. U.S. Pat. Nos. 4,207,004; 4,289,319 and 4,300,842 disclose rotary processor seals to resist flow of liquid material into the clearance between the housing and the rotor.

U.S. Pat. No. 3,267,075 discloses a method for removing solvents used in the production of polycarbonates to obtain pure polycarbonate from a dilute solution containing from about 2% to about 30–40% polycarbonate. The method comprises heating the dilute solution to at least the boiling point of the solvent, volatilizing a portion of the solvent, mixing with the remaining solution using known equipment and procedures a devolatilizing aid comprising a chemically inert material having a boiling point below the decomposition temperature of the polycarbonate and heating this mixture to volatilize the remaining solvent and impurities. The polycarbonate may then be extruded as a purified product. In a preferred embodiment, these steps are carried out in a single multi-section screw extruder.

U.S. Pat. Nos. 3,799,234 and 3,963,558 disclose apparatus and methods for removing dissolved solvent from polymers in multi-stage screw extruder-devolatilizers. U.S. Pat. No. 3,799,234 discloses a sealed stage of the extruder for injecting a gas such as steam for countercurrent flow to strip volatile components from the polymer, the major portion of the injected gas being removed upstream of the point of injection. Also disclosed in the patent is a provision for injecting water into the material to cool the polymer at a point downstream of a pressure seal isolating the upstream injection section. This water is removed as a vapor through an additional vent positioned between the water injection point and the steam injection section. U.S. Pat. No. 3,963,558 discloses as one of the final steps in purifying the polymer injecting for countercurrent flow a stripping fluid which is removed as a vapor upstream of the introduction point. More than one fluid injection section may be provided, each section being separated by a pressure seal.

However, addition and dispersion of a low viscosity liquid, such as a carrier to aid devolatilization, to a viscous material such as a polymer melt, as is described in above U.S. Pat. Nos. 3,267,075; 3,799,234 and 3,963,558, usually involves injection of the low viscosity liquid directly into the pressurized viscous material at a relatively high processing temperature. The injected liquid experiences back pressure from the viscous material as droplets or globules of liquid are being formed at the outlet of the injection means. This back pressure can result in injection rate control difficulties and plugging of the injection outlet by the viscous material. In particular, addition of low viscosity devolatilizing aids and subsequent devolatilization may require multi-section devolitilizing screws of extensive length and high energy input.

This invention presents to the art novel rotary processors and methods for simply, efficiently and thoroughly mixing low viscosity liquids with viscous materials.

SUMMARY OF THE INVENTION

The novel processors and methods of this invention provide improved mixing of low viscosity liquids with viscous liquid materials while controlling plugging of the means for introducing low viscosity liquid to the processor. The mixing methods and apparatus of the present invention involve a rotary mixing processor comprising one or more annular channels carried by a rotor and enclosed by a housing to form mixing passages. Each passage has an inlet, a member providing a passage end wall spaced apart from the inlet and an outlet near the end wall. The end wall is positioned downstream of and a major portion of the circumferential distance about the passage from the inlet. Viscous material fed to the inlet is dragged forward by the rotating side walls of the channel toward the end wall before collection as a recirculating pool, mixing, and discharge from the passage. A spreader extends into the channel at a point between the inlet and the end wall to spread viscous material on the rotating side walls of each mixing passage as films, forming a void between the films. Spray means are provided within the void, preferably at a downstream surface of the spreader, to introduce low viscosity liquid to the passage. In one embodiment of the invention, the liquid is sprayed onto the films of material to be carried downstream with the films for mixing with the viscous material at the end wall.

In a preferred embodiment, a mixing passage according to the invention is utilized to purify a viscous material containing one or more difficultly devolatilizable impurities by mixing with the viscous material a low boiling liquid selected to serve as a devolatilizing aid to form a homogeneous mixture from which the devolatilizing aid and the impurities may be devolltilized.

In another, especially preferred embodiment, sealing means are provided to prevent leakage of pressurized vapors of the volatile materials through the clearance between the rotor and the closure surface of the housing. This sealing permits buildup of the partial pressure of the vapor in the void between the films on the sidewalls to a level substantially equal to the vapor pressure of the low viscosity liquid at the processing temperature, forming a saturated vapor zone in the void. As additional low viscosity liquid is introduced to the saturated vapor zone, the vapor condenses on the films as well distributed, fine droplets, the size and distribution of the droplets being independent of the nozzle geometry. Thus, improved mixing may be achieved using ordinary spray nozzles, as a result of improved distribution. The well distributed, low viscosity liquid is then intimately mixed at the recirculating pool at the end wall.

In an alternate arrangement, the recirculating pool may be collected and mixed at a point upstream of the end wall by providing an additional spreader or a blocking member at a point between the first spreader and the end wall.

Details relating to the novel mixing apparatus and methods of the invention as well as the advantages derived therefrom will be more fully appreciated from the Detailed Description of the Preferred Embodiments taken in connection with the Drawings.

DETAILED DESCRIPTION OF THE PREFERRED EMBODIMENTS

Figure 1:
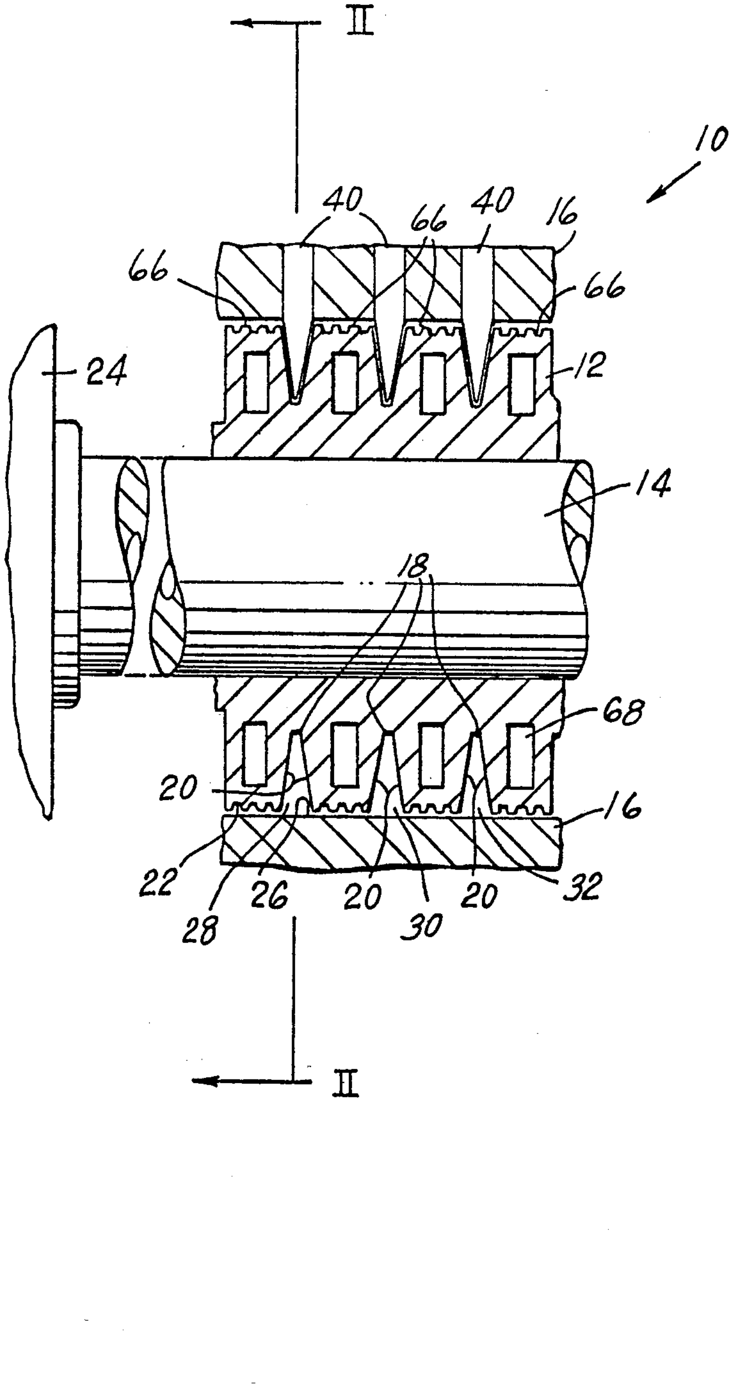
FIG. 1 is a simplified cross-sectional view of a mixing processor of the invention, taken along line I—I of FIG. 2.
Figure 2:
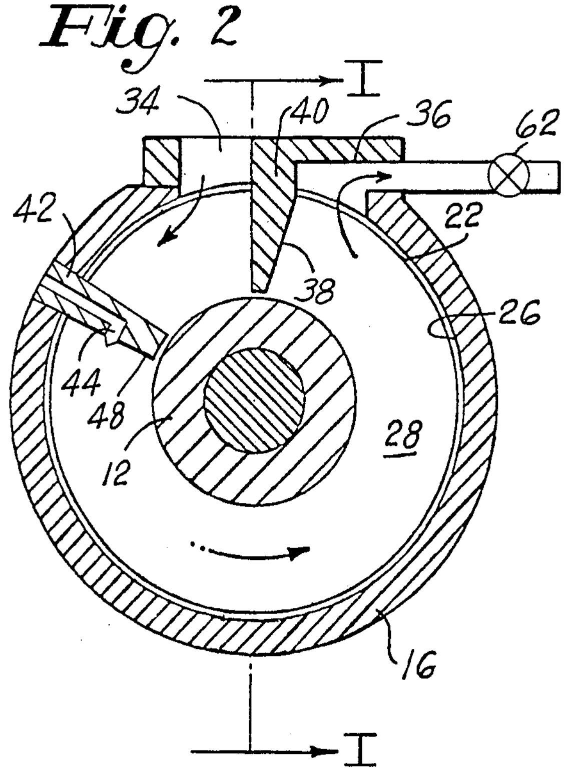
FIG. 2 is simplified cross-sectional view of the processor of FIG. 1 taken along the line II—II of FIG. 1.
Figure 3:
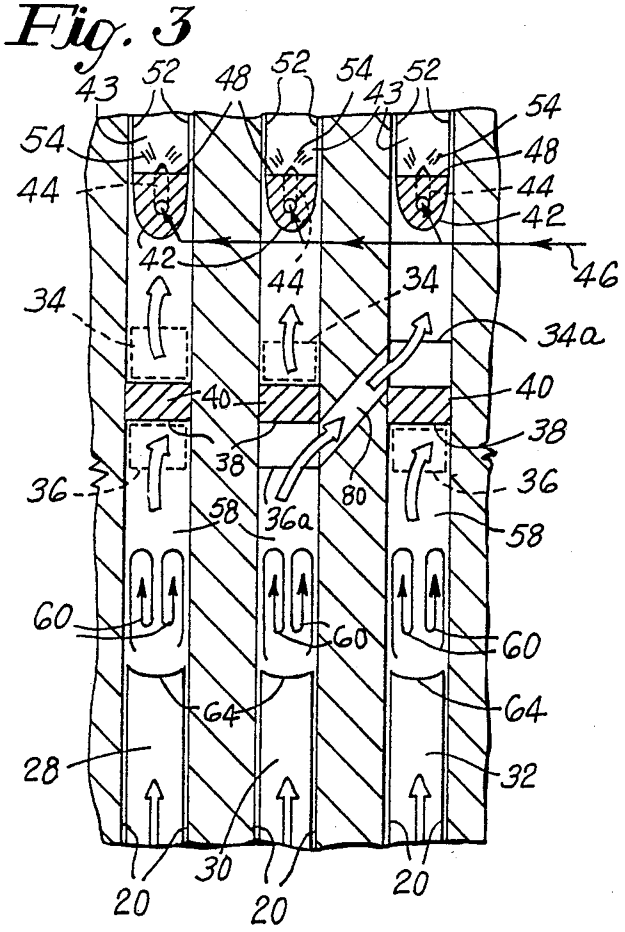
FIG. 3 is a simplified schematic view of processing passages of the processor of FIG. 1, with arrows indicating the flow direction of material through each passage, and schematically illustrating spray means for introducing low viscosity liquid to the passage.

Referring first to FIGS. 1-3, novel mixing processor 10 of one embodiment of the invention includes rotor 12 mounted on drive shaft 14 for rotation within a stationary element comprising housing 16. Rotor 12 carries mixing channels 18 each having opposed side walls 20 extending inwardly from rotor surface 22. Means 24 for rotating rotor 12 may be of any suitable type commonly used for rotating extruders or similar processing apparatus and are well known to those skilled in the art. Housing 16 provides coaxial closure surface 26 cooperatively arranged with surface 22 of rotor 12 to form with channels 18 enclosed mixing passages 28, 30 and 32. Representative passage 28, as shown in FIG. 2, includes inlet 34 and outlet 36, formed in housing 16. Stationary member 40, associated with housing 16, fits closely within channel 18 and provides end wall 38 for the passage near outlet 36. End wall 38 and outlet 36 are positioned downstream of and a major portion of the circumferential distance about the passage from inlet 34.

In operation viscous liquid material entering the passage through inlet 34 is dragged by rotating side walls 20 toward end wall 38 for collection as a recirculating pool and pressurization induced by the continued rotation of side walls 20 past the pool for discharge from the passage through outlet 36. The pressurization of viscous material at the stationary end wall of a rotating annular channel and the discharge through an outlet is described in detail in U.S. Pat. Nos. 4,142,805 and 4,194,841, referenced above.

FIGS. 2 and 3 illustrate means according to the invention for introducing low viscosity liquid to the passage for mixing with the viscous material. Spreader 42, associated with housing 16, extends into channel 18 to block at least some of the material entering passage 28 and spread the material dragged past the spreader onto side walls 20 of the passage to be carried toward end wall 38 as films 52 on the side walls, creating void 43 betwen the films and downstream of spreader 42. Spray means 44 for introducing solvent liquid to the passage from a point within the void is illustrated in FIGS. 2 and 3 as a conventional conduit and spray nozzle assembly arranged to receive low viscosity liquid from supply means 46, normally positioned outside of the housing. In a preferred arrangement, spray means 44 is carried by spreader 42 with the spray nozzle positioned within void 43 at or near downstream surface 48 of spreader 42. In operation, as illustrated in FIG. 3, viscous material entering the passage at inlet 34 is collected upstream of spreader 42 and is spread as films 52 on rotating side walls 20 of the passage, creating void 43 downstream of the spreader. Low viscosity liquid from supply means 46 is introduced to the passage through spray means 44 and is sprayed onto films 52 from a point within void 43, as shown at 54, thus avoiding plugging of the spray nozzle by back pressure from the viscous material. The sprayed liquid is carried with films 52 toward end wall 38 to be collected with the viscous material as recirculating pool 58. In pool 58 a vigorous mixing action is effected, as shown by arrows 60, by the continued rotation of side walls 20 past the recirculating pool. This mixing action finely disperses and/or dissolves the low viscosity liquid in the viscous material. The mixture of viscous material and low viscosity liquid is pressurized for discharge from the passage through the outlet, as described above.

Outlet control means such as valve 62, shown in FIG. 2, may be used to control the size of recirculating pool 58 and thus the angular position of pool boundary 64, shown in FIG. 3, also affecting the residence time, temperature and discharge pressure, and controlling the extent of mixing of the low viscosity liquid in the viscous material in recirculating pool 58. Also, although continuous operation of the processor is normally preferred, valve 62 may be used to effect batch processing if desired by closing valve 62 during processing and opening the valve for discharge of the processed material.

Preferably, sealing means such as seals 66 (FIG. 1) are provided, e.g. on rotor surface 22, to prevent leakage of pressurized viscous material from the passage through the clearance between rotor surface 22 and closure surface 26. The temperature of the material within the passages may be controlled such as by temperature control means 68 (FIG. 1), which is a series of chambers within rotor 12 and/or elsewhere in the processor, through which a heat transfer fluid may be circulated in known manner to provide heating or cooling of the material in the passages. Details relating to examples of suitable sealing means 66 and heating means 68 can be found in U.S. Pat. Nos. 4,142,805; 4,194,841; 4,207,004; 4,289,319 and 4,300,842, referenced above and incorporated herein by reference.

An especially preferred embodiment provides improved control of the processing conditions and improved mixing of low viscosity liquid and viscous material using ordinary spray nozzles. In this embodiment, seals 66 comprise pressure seals to control leakage from the passage of pressurized vapors and low viscosity liquid as well as viscous material through the clearance between rotor surface 22 and closure surface 26. Suitable pressure seals are disclosed in Applications 532,157 and 532,165, referenced above and incorporated herein by reference. Such pressure seals permit establishment of a saturated vapor zone within the void between films 52 on the side walls and between spreader 42 and pool boundary 64. Spreader 42 and pool 58 aid sealing of the saturated vapor zone by providing liquid seals to prevent pressure leakage from the void to upstream and/or downstream portions of the passage.

In operation, viscous material being dragged past spreader 42 forms a liquid seal preventing upstream leakage of pressurized vapors past the spreader. The spreading of viscous material on the moving walls creates void 43 downstream of the spreader between the films of material. Upstream boundary 64 of recirculating pool 58 defines the downstream extent of the void while pool 58 itself forms a liquid seal preventing downstream leakage of pressurized vapors. The pressure seals described in Applications Nos. 532,157 and 532,165 control vapor leakage through the clearances between surfaces 22 and 26, providing a zone capable of containing pressurized vapors. Cooled low viscosity liquid is introduced to the passage through spray means 44 in the manner described above at a pressure near the vapor pressure of the liquid at the processing temperature and at a temperature lower than the processing temperature. The sprayed low viscosity liquid partially vaporizes into void 43. Sealing of the vapor zone permits buildup of the partial pressure of the vapor in the void to a level substantially equal to the vapor pressure of the low viscosity liquid at the processing temperature, forming a saturated vapor zone in the void. As additional low viscosity liquid is introduced to the saturated vapor zone, the vapor condenses on the films as well distributed, fine droplets, the size and distribution of the droplets being independent of nozzle geometry. Thus improved mixing may be achieved using ordinary spray nozzles, as a result of improved distribution. The well distributed, low viscosity liquid is then intimately mixed at the recirculating pool at the end wall.

Processors according to the invention are especially suitable for addition of low boiling liquids such as carrier liquids or devolatilizing aids for removal of difficultly devolatilizable impurities from viscous materials. When operated as part of a devolatilizing apparatus, rotary mixing processors according to the invention may be arranged to spray or deposit onto films 52 of viscous material in the manner described above a low viscosity, low boiling carrier liquid. The carrier liquid is selected to act as a devolatilizing aid to remove one or more of the difficulty devolatilizable impurities contained in the viscous material. The proportion of carrier liquid relative to the material is selected to be sufficient to remove at least a portion of the impurities contained in the material. Following the mixing of carrier liquid and viscous material in the mixing passage, the mixture is devolatilized to separate the carrier liquid and at least a portion of the impurities from the viscous material. This mixing of carrier liquids with viscous materials may be carried out either by spraying liquid carrier onto films of material or, preferably, under saturated vapor conditions, as described above. Also, for further purification of some materials, the mixing and devolatilizing steps may be repeated two or more times in series.

Rotary mixing processors according to the invention may have a single passage or a plurality of passages. Two or more passages may be arranged to operate in parallel as a single stage, each passage having an inlet to receive material from outside the processor and a outlet to discharge material from the processor, as illustrated in FIGS. 2 and 3 for passage 28 of processor 10. Alternatively, the passages may be arranged to operate in series or in a combination of series and parallel operation, providing multi-stage operation for the apparatus.

For example, for some materials or for some processing conditions it may be desirable to introduce low viscosity liquid into the mixing passage and mix the liquid with the viscous material two or more times in series. Such an arrangement is shown schematically in FIG. 3, in which mixing passages 30 and 32 of processor 10 are interconnected by material transfer groove 80. Material transfer groove 80 is formed in the closure surface, extending from a point near end wall 38 of passage 30 to passage 32, and provides outlet **36*a* for passage 30 and inlet 34*a* for passage 32**.

In operation, viscous liquid material is introduced to passage 30 at inlet 34 and is spread by spreader 42 as films 52 on side walls 20 of passage 30 to be carried toward end wall 38 for collection and mixing. Spray means 44 of passage 30 sprays low viscosity liquid from a point within void 43 to be deposited onto films 52 to be carried with the films toward one end wall 38 and mixed with the viscous material in recirculating pool 58. The resulting mixture is pressurized for discharge through outlet **36*a* and transfer to passage 32 through material transfer groove 80**.

The mixture enters passage 32 through inlet 34a and is spread by spreader 42 as films on side walls 20 of passage 32 to be carried toward end wall 38 for collection and mixing. Spray means 44 of passage 32 sprays additional low viscosity liquid from a point within void 43 to be deposited onto films 52 of the mixture to be carried with the films toward end wall 38 and dispersed in the viscous material in recirculating pool 58. The mixture of viscous material and low viscosity liquid is pressurized for discharge from passage 32 through outlet 36.

The processor shown in FIG. 2 illustrates spray means 44 providing a single spray nozzle. Alternatively other types of spray means may be provided. For example, FIG. 4 shows spray means 44a having two spray nozzles interconnected by a common conduit through spreader 42 to spray low viscosity liquid onto the films of material carried past spreader 42.

Figure 4:
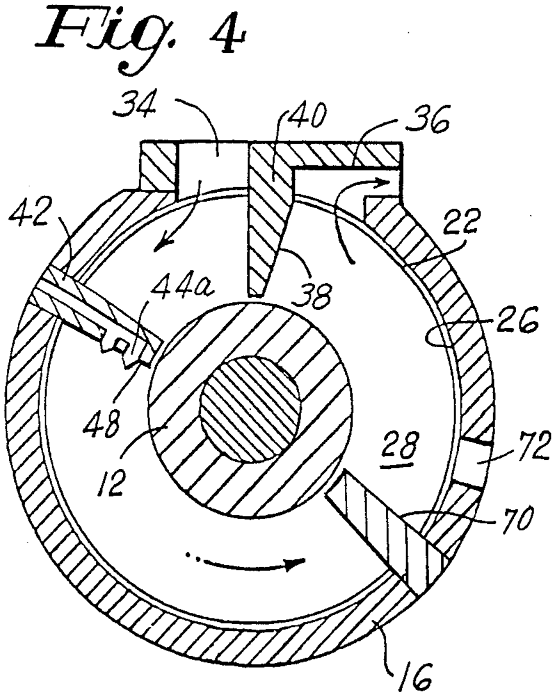
FIG. 4 is a simplified cross-sectional view similar to FIG. 2 of an alternate arrangement of a processing passage according to the invention.

FIG. 4 also illustrates an alternate arrangement of a mixing passage according to the invention providing blocking member 70 associated with housing 16 and extending into the channel between spray means 44a and end wall 38 to partially block, collect and mix the material and liquid at an upstream surface of blocking member 70. Following the mixing upstream of blocking member 70, the mixture is dragged past blocking member 70 toward the end wall. In a preferred embodiment of the processor illustrated in FIG. 4, blocking member 70 comprises a second spreader extending into the channel and providing a clearance between each of the opposed channel side walls and the second spreader. At least a portion of the mixture collected upstream of the spreader is dragged through the clearances by the rotating side walls of the channel and spread as films on the side walls to be carried toward the end wall in a manner similar to that described above with respect to spreader 42. Optional port 72 may be provided through the housing between blocking member 70 and the end wall, to provide venting of the void formed in the passage between the films and downstream of blocking member 70.

The apparatus and methods of the present invention may be utilized to mix a low viscosity fluid with a viscous material to form either a homogeneous or a heterogenous mixture. Anticipated commercial uses include the mixing of such low viscosity liquids as reactants, monomers, initiators or inhibiters with viscous materials for polymerization or copolymerization, as well as the injection of an inert stripping fluid such as water or pentane into polymer melts such as polystyrenes for purification of the polymer by vacuum stripping.

It should be understood that the invention is not intended to be limited by what has been particularly shown and described but only as indicated in the accompanying claims. Accordingly, the invention presents to the art novel, energy efficient rotary processors and methods for mixing low viscosity liquids with viscous materials.

I claim:

1. A method for mixing a low viscosity liquid with a viscous material comprising:

A. introducing the viscous material at an inlet to one or more substantially annular mixing passages each defined by two rotatable, substantially circular walls, a stationary surface coaxial with the circular walls and enclosing the mixing passage, an end wall positioned downstream of and a major portion of the circumferential distance about the passage from the inlet, and a spreader positioned between the inlet and the end wall;

B. rotating the circular walls of each mixing passage at substantially equal velocities, in the same direction from the inlet toward the end wall, so that the material introduced at the inlet is dragged forward by the circular walls from the inlet toward the end wall of each mixing passage;

C. partially blocking upstream of the spreader the downstream movement of the dragged-forward material in each mixing passage and spreading the blocked material at the spreader on the circular walls of each mixing passage so that at least a portion of the material is dragged downstream past the spreader as films on the circular walls and so that a void is formed downstream of the spreader and between the films;

D. spraying the low viscosity liquid within the void in such a way that the low viscosity liquid is deposited on and carried downstream with the films of viscous material;

E. containing within the void a zone of saturated vapor of the low viscosity liquid at a partial pressure equal to the vapor pressure of the liquid at the processing temperature so that the liquid sprayed into the void vaporizes to be condensed on the films of material as well distributed fine droplets;

F. blocking at the end wall the downstream movement of the material and liquid and collecting the material and liquid so that a recirculating pool of material and liquid is formed at the end wall in which the liquid is mixed with the material; and G. discharging the mixture of the material and the liquid from the mixing passage at an outlet near the end wall.

2. A method according to claim 1 further comprising the step of partially blocking the downstream movement of the material and liquid and collecting the material and liquid between the spreader and the end wall so that an additional recirculating pool of material and liquid is formed in which the liquid is mixed with the material.

3. A method according to claim 2 wherein the step of partially blocking and collecting the material and liquid between the spreader and the end wall is effected at an upstream surface of a second spreader and further comprising the step of dragging the mixture downstream past the second spreader so that at least a portion of the mixture is respread on the circular walls as films and so that a second void is formed downstream of the second spreader and between the respread films.

4. A method according to claim 1 wherein the sequence of steps A–G are carried out two or more times in a series.

5. A method according to claim 1 further comprising the step of controlling the temperature of the material during at least a portion of the mixing process.

6. A method for devolatilizing a viscous material to remove one or more impurities comprising:

A. introducing the viscous material containing the impurities at an inlet to one more substantially annular mixing passages each defined by two rotatable, substantially circular walls, a stationary surface coaxial with the circular walls and enclosing the mixing passage, an end wall positioned downstream of and a major portion of the circumferential distance about the passage from the inlet, and a spreader positioned between the inlet and the end wall;

B. rotating the circular walls of each mixing passage at substantially equal velocities, in the same direction from the inlet toward the end wall, so that the material introduced at the inlet is dragged forward by the circular walls from the inlet toward the end wall of each mixing passage;

C. partially blocking upstream of the spreader the downstream movement of the dragged-forward material in each mixing passage and spreading the blocked material at the spreader on the circular walls of each mixing passage so that at least a portion of the material is dragged downstream past the spreader as films on the circular walls and so that a void is formed downstream of the spreader and between the films;

D. spraying within the void a low viscosity, low boiling carrier liquid selected to act as a devolatilizing aid to remove one or more of the impurities contained in the viscous material, in such a way that the carrier liquid is deposited on and carried downstream with the viscous material, and in a proportion relative to the material sufficient to remove at least a portion of the impurities contained in the material;

E. containing within the void a zone of saturated vapor of the carrier liquid at a partial pressure substantially equal to the vapor pressure to the carrier liquid at the processing temperature so that the carrier liquid sprayed into the void vaporizes to be condensed on the films of material as well distributed fine droplets;

F. blocking at the end wall the downstream movement of the material and carrier liquid and collecting the material and carrier liquid so that a recirculating pool of material and carrier liquid is formed at the end wall in which the carrier liquid is mixed with the material to a degree sufficient to aid devolatilization of at least a portion of the impurities from the viscous material;

G. discharging the mixture of material and the carrier liquid from the mixing passage at an outlet near the end wall; and H. devolatilizing the mixture to separate the carrier liquid and at least a portion of the impurities from the viscous material.

7. A method according to claim 6 further comprising the step of partially blocking the downstream movement of the material and carrier liquid and collecting the material and carrier liquid between the spreader and the end wall so that an additional recirculating pool of material and carrier liquid is formed in which the carrier liquid is mixed with the material.

8. A method according to claim 7 wherein the step of partially blocking and collecting the material and carrier liquid between the spreader and the wall is effected at an upstream surface of a second spreader and further comprising the step of dragging the mixture downstream past the second spreader to that at least a portion of the mixture is respread on the circular walls as films and so that a second void is formed downstream of the second spreader and between the respread films.

9. A method according to claim 6 wherein the sequence of steps A–H are carried out two or more times in series.

10. A method according to claim 6 further comprising the step of controlling the temperature of the material during at least a portion of the devolatilizing process.

11. Apparatus for mixing a low viscosity liquid with a viscous material comprising:

A. a rotatable element comprising a rotor carrying one or more annular mixing channels, each channel having opposed side walls extending radially inwardly from the rotor surface;

B. a stationary element having a coaxial closure surface cooperatively arranged with the channels to provide one or more enclosed mixing passages, each mixing passage having an inlet, a member providing an end wall for the passage and spaced apart from the inlet, an outlet near the end wall, and a spreader extending into the channel between the inlet and the end wall and providing a clearance between each of the opposed side walls of the channel and the spreader, all associated with the stationary element and arranged so that viscous material fed to the inlet is dragged forward by the rotating side walls past the spreader so that at least a portion of the material is dragged through the clearance between the walls and the spreader and spread as films on the side walls to be collected and mixed at the end wall and discharged through the oulet, and so that a void is formed downstream of the spreader and between the films;

C. spray means arranged to spray the low viscosity liquid within the void in such a way that the liquid is deposited on and carried downstream with the films of viscous material toward the end wall to be mixed with the viscous material; and D. pressure sealing means to control leakage from the void of vapors of the low viscosity liquid and to permit the containment within the void of a zone of saturated vapor of the low viscosity liquid at a partial pressure substantially equal to the vapor pressure of the liquid at the processing temperature so that liquid sprayed into the void vaporizes to be condensed on the films of material as well distributed fine droplets.

12. Apparatus according to claim 11 wherein the spray means comprises at least one spray nozzle positioned in the void at or near a downstream surface of the spreader and a conduit through the spreader interconnecting the nozzle and a liquid supply means.

13. Apparatus according to claim 11 further comprising a blocking member associated with the housing and extending into the channel between the spray means and the end wall to partially block, collect and mix the material and liquid at an upstream surface of the blocking member before the mixture is dragged past the blocking member toward the end wall.

14. Apparatus according to claim 13 wherein the blocking member comprises a second spreader providing a clearance between each of the opposed channel side walls and the second spreader, so that at least a portion of the mixture is dragged through the clearance and respread as films on the side walls.

15. Apparatus according to claim 11 further comprising at least one material transfer groove interconnecting an adjacent pair of passages for in-series operation, each material transfer groove being formed in the closure surface and extending from near the end wall of the upstream passage to the more downstream passage and providing the outlet for the more upsteam passage and the inlet for the more downstream passage.

16. Apparatus according to claim 11 further comprising means for controlling the temperature of the material in at least a portion of the apparatus.

17. Apparatus for devolatilizing a viscous material to remove one or more impurities comprising:

A. a rotatable element comprising a rotor carrying one or more annular mixing channels, each channel having opposed side walls extending radially inwardly from the rotor surface;

B. a stationary element having a coaxial closure surface cooperatively arranged with the channels to provide one or more enclosed mixing passages, each mixing passage having an inlet, a member providing an end wall for the passage and spaced apart from the inlet, an outlet near the end wall, and a spreader extending into the channel between the inlet and the end wall and providing a clearance between each of the opposed side walls of the channel and the spreader, all associated with the stationary element and arranged so that viscous material fed to the inlet is dragged forward by the rotating side walls past the spreader so that at least a portion of the material is dragged through the clearance between the walls and the spreader and spread as films on the side walls to be collected and mixed at the end wall and discharged through the outlet, and so that a void is formed downstream of the spreader and between the films;

C. spray means arranged to spray within the void a low viscosity, low boiling carrier liquid selected to act as a devolatilizing aid to remove one or more of the impurities contained in the viscous material, in such a way that the carrier liquid is deposited on and carried downstream with the viscous material toward the end wall to be mixed with the viscous material, and in a proportion relative to the viscous material sufficient to remove at least a portion of the impurities contained in the material;

D. pressure sealing means to control leakage from the void of vapors of the carrier liquid and to permit the containment within the void of a zone of saturated vapor of the carrier liquid at a partial pressure substantially equal to the vapor pressure of the carrier liquid at the processing temperature so that carrier liquid sprayed into the void vaporizes to be condensed on the films of material as well distributed fine droplets; and E. means to devolatilize the mixture to separate the carrier liquid and at least a portion of the impurities from the viscous material.

18. Apparatus according to claim 17 wherein the spray means comprises at least one spray nozzle positioned in the void at or near a downstream surface of the spreader and a conduit through the spreader interconnecting the nozzle and a carrier liquid supply means.

19. Apparatus according to claim 17 further comprising a blocking member associated with the housing and extending into the channel between the spray means and the end wall to partially block, collect and mix the viscous material and carrier liquid at an upstream surface of the blocking member before the mixture is dragged past the blocking member toward the end wall.

20. Apparatus according to claim 19 wherein the blocking member comprises a second spreader providing a clearance between each of the opposed channel side walls and the second spreader, so that at least a portion of the mixture is dragged through the clearances and respread as films on the side walls.

21. Apparatus according to claim 17 and further comprising at least one material transfer groove interconnecting an adjacent pair of passages for in-series operation, each material transfer groove being formed in the closure surface and extending from near the end wall of the more upstream passage to the more downstream passage and providing the outlet for the more upstream passage and the inlet for the more downstream passage.

22. Apparatus according to claim 17 further comprising means for controlling the temperature of the material in at least a portion of the apparatus.

* * * * *